Patented Nov. 23, 1926.

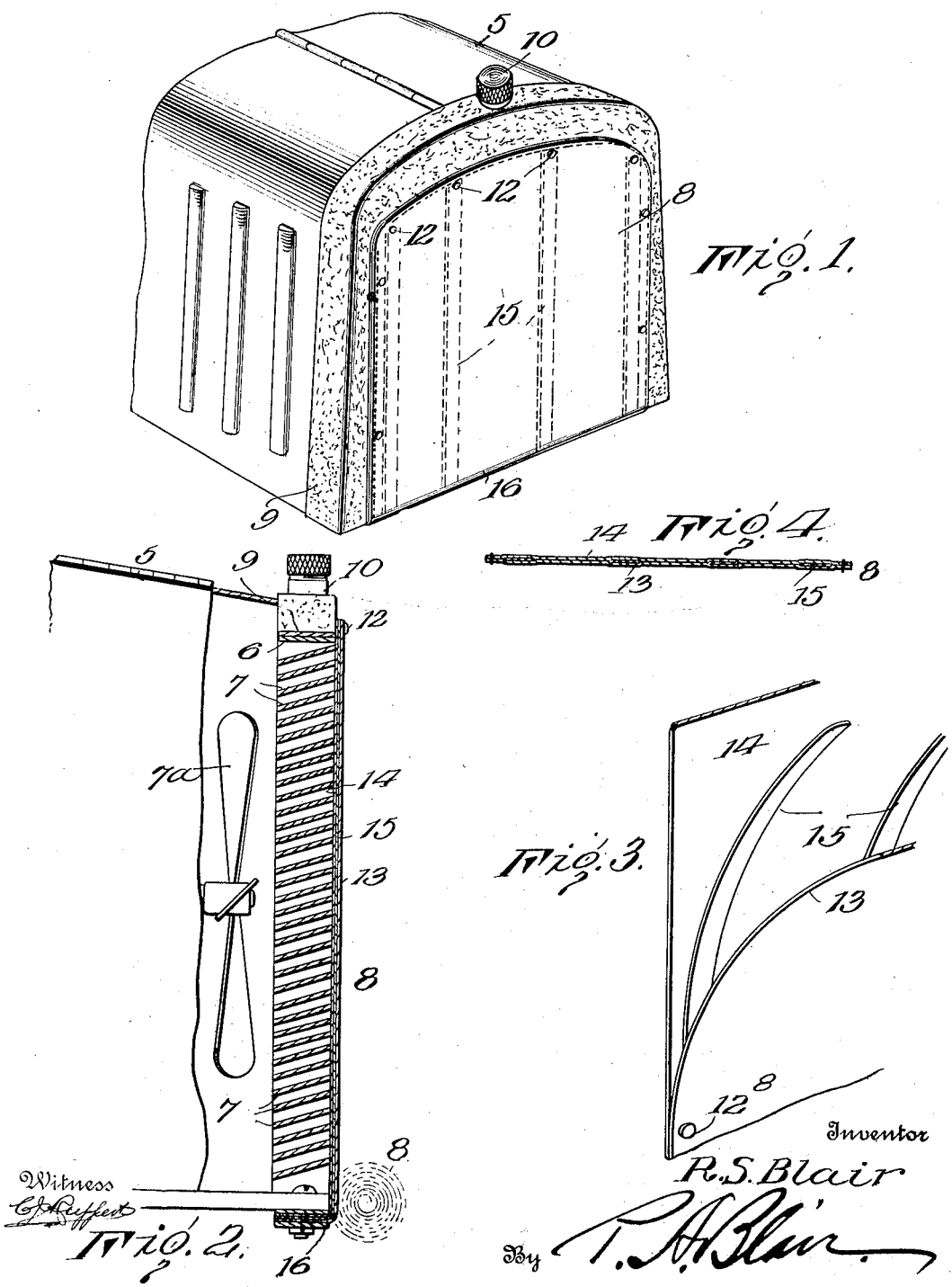

1,608,161

UNITED STATES PATENT OFFICE.

ROBERT S. BLAIR, OF SOUTH ORANGE, NEW JERSEY.

RADIATOR AND COVER THEREFOR.

Application filed February 8, 1917. Serial No. 147,327.

This invention relates to radiators and covers therefor and in its more specific aspect to automobile radiators and covers or protectors designed to cooperate therewith to retain the heat of the circulating medium within the radiator after use and thereby to prevent cooling of the circulating medium within the radiator for a reasonable time thereafter.

Various forms and types of covers, curtains and the like have been used in connection with different types of radiators for this general purpose, but for the most part they have proven ineffectual, unsightly, expensive and unsatisfactory for such reasons as being difficult to properly fit and conveniently and quickly remove, or that they failed to properly maintain the heat about the radiator for a desirable length of time. It is an object, therefore, of the present invention to overcome these and other objections by providing a radiator having certain peculiar characteristics with a cover, curtain or flap especially designed to coact with such peculiarities of the radiator thereby to most efficiently confine the heat of the heated circulating medium within the radiator, to a desired locality for a longer length of time after the engine has been stopped than has heretofore been accomplished. A further object is to provide a simple and practical curtain designed to cover completely or to any desired extent the front of the radiator of an automobile or similar vehicle and to lessen radiation therefrom. Another object is to provide an inexpensive device of the above general character having a neat pleasing appearance which may be easily applied to machines now in use and put into operative position or removed and rolled up with a minimum amount of trouble and labor. Another object is to provide a practical protective curtain for a radiator which may be quickly applied and removed and is compact in all conditions.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings like characters of reference denote corresponding parts throughout all the views, in which—

Fig. 1 is a perspective view of the front of an automobile hood with the curtain or protector flap applied thereto;

Fig. 2 is a vertical central sectional view through the radiator and curtain;

Fig. 3 is a detail perspective view of a part of the curtain;

Fig. 4 is a detailed horizontal sectional view of part of the curtain.

Referring now to the drawing in detail and more particularly to Fig. 1, 5 denotes the hood of an automobile provided at its forward end with a radiator 6 of the usual "honey comb" type, as shown more clearly in Fig. 2, that is, the radiator has the usual intake head at the top and outlet head at the bottom and is provided with an intervening radiating surface constituting a plurality of adjacent transversely extending openings 7 extending throughout the entire area of the front of the hood about which openings the circulating medium passes. It is to be understood that the term "honey comb type" is used throughout in a broad sense to indicate a radiator having transverse air passages, irrespective of the precise form or position of such passages. The walls of these openings preferably have an inclination upwardly and forwardly with respect to the longitudinal measurement of the machine. In the usual operation of the machine, as is well known to those familiar with the subject, the air rushes through these laterally disposed openings 7, drawn by the engine-driven fan 7ª, and materially aids in cooling the water which circulates thereabout in passing from one head to the other for the purpose of keeping the temperature of the cylinders within proper limits for the desired high degree of efficiency of operation. In cold weather, however, there is a tendency for the radiators to cool quickly and even to freeze if the car is left idle for a material length of time. In order to overcome this objection, there is provided a curtain 8 secured at the bottom to a leather jacket 9 which removably encases the radiator 6 and through which the filling cap 10 projects. Curtain 8 is held at its sides and top to jacket 9 by means of coacting fasteners 12 about its periphery. This curtain may be made of any desired material, but is preferably of soft yielding waterproof sheets 13—14 having a low heat conductivity. It is to be understood that the term "heat-retaining" is used broadly to denote any curtain adapted to perform this function, irrespective of its precise material or construction. Intermediate the sheets or layers of this material, as shown more clearly in Fig. 3, there is provided a plurality of flexible resilient members 15 varying in number, according to the size of the curtain. These members 15 are preferably coiled spiral springs of flat steel adapted to perform not only the function of automatically rolling the curtain in whole or in part, when the several fastening buttons are released, but they are also adapted to hold the curtain closely adjacent the front of the radiator, as shown in Fig. 2. The curvature of the springs in other words is such as to hold the inner soft layer 14 of the curtain closely and even tightly against the forward edges of each of the upwardly inclined "honey comb" holes 7 of the radiator, thereby forming a series of pockets throughout its entire area in which the heat is collected and retained, as indicated in Fig. 2. The springs may be secured at the bottom to a cross piece 16 and to prevent lateral displacement are secured within the curtain. By means of this peculiar construction, a safe degree of heat may be maintained in the desired locality for a much greater time than would ordinarily take place if the openings in the radiator were more nearly horizontal or on the other hand, if the curtain were not held in such close and snug relation over the entire surface of the front of the radiator due in part to its peculiar construction.

One of the snap fasteners 12 is preferably provided opposite the upper end of each spring and also at suitably spaced points at the sides, substantially opposite, as shown, to permit a partial coiling and lessened radiation when the engine is used in cold weather.

The present invention is of simple and practical construction, reliable and efficient in use and operation and is adapted to accomplish, among others, all of the objects and advantages above set forth.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention what I claim as new and desire to secure by Letters Patent is:

1. In combination with a "honey comb" radiator having upwardly inclined passages, a curtain adapted to coact with said passages and means for maintaining it in relatively close position to the upper ends of said passages.

2. In combination with a "honey comb" radiator having forwardly and upwardly inclined passages, a flexible curtain adapted to coact with the front surface of said radiator, and means for holding the said curtain in close engagement with the front of said radiator.

3. In combination with a radiator of the "honey-comb" type having upwardly inclined passages, and means adapted at will to close the upper ends of said passages.

4. In combination with a radiator, a curtain adapted to co-act therewith comprising heat-retaining means and a plurality of spring members secured to said curtain substantially throughout its effective length tending to roll said curtain with themselves in a direction outward from said radiator.

5. In combination with a radiator, a curtain positioned and adapted to co-act with the forward surface thereof, comprising heat-retaining means and springs substantially parallel with each other and substantially at the edges of said curtain, said springs tending to coil and thereby roll said curtain in a direction outward from said radiator.

6. In combination with a radiator, a curtain adapted to co-act therewith comprising heat-retaining means and a plurality of spring members extending along said curtain tending to roll it with themselves in a direction outward from and downwardly along said radiator.

7. In combination with a radiator of the honey-comb type, having forwardly and upwardly inclined passages, a curtain adapted to co-act therewith comprising heat-retaining means and a plurality of spring members secured thereto and extending substantially parallel, said spring members being positioned and adapted to coil said curtain in a direction outwardly from and downwardly along said radiator.

8. In combination with a radiator of the honey-comb type having forwardly and upwardly inclined passages, a curtain adapted and positioned to co-act with the forward surface thereof, comprising heat-retaining means and resilient metal members secured thereto and tending to roll the curtain.

In testimony whereof I affix my signature.

ROBERT S. BLAIR.